W. D. THOMAS.
HEAD END AND CLEVIS.
APPLICATION FILED JULY 21, 1916.
1,241,451.
Patented Sept. 25, 1917.
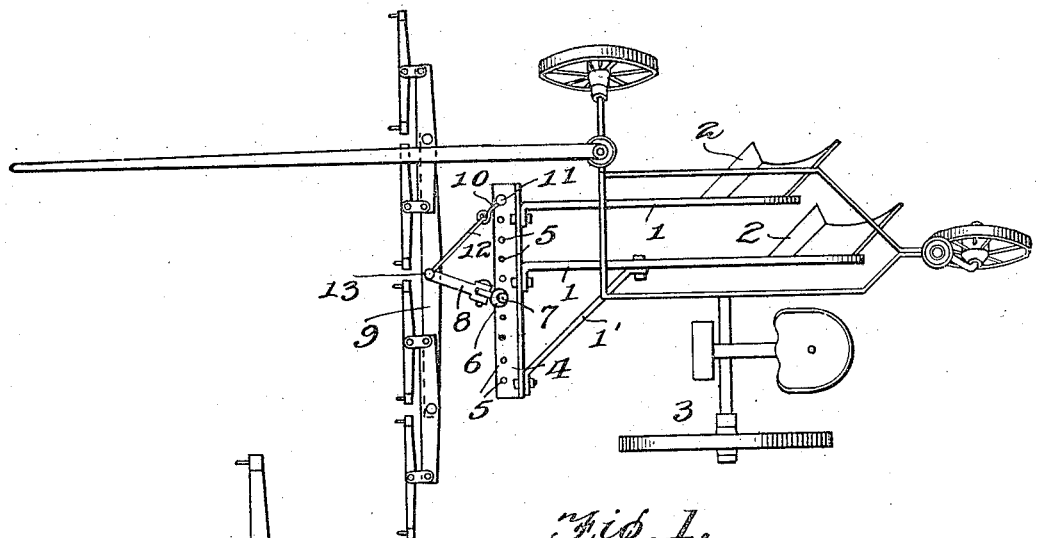
Fig. 1.
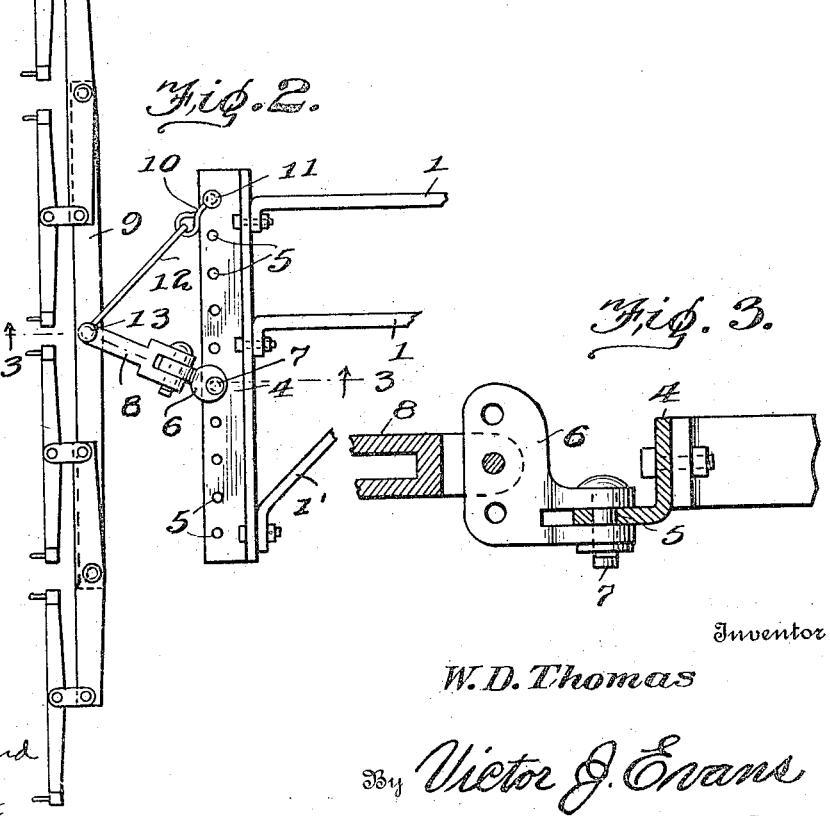
Fig. 2.
Fig. 3.
Inventor
W. D. Thomas
Witnesses
By Victor J. Evans
Attorney

UNITED STATES PATENT OFFICE.

WILLIE D. THOMAS, OF GOLDEN CITY, MISSOURI.

HEAD END AND CLEVIS.

1,241,451.     Specification of Letters Patent.     Patented Sept. 25, 1917.

Application filed July 21, 1916. Serial No. 110,570.

*To all whom it may concern:*

Be it known that I, WILLIE D. THOMAS, a citizen of the United States, residing at Golden City, in the county of Barton and State of Missouri, have invented new and useful Improvements in Head Ends and Clevises, of which the following is a specification.

This invention relates to head ends and clevises adapted to be used upon plow beams and it consists in the novel features hereinafter described and claimed.

An object of the invention is to provide a device of the character indicated which when applied to plow beams and when draft animals are hitched to the same is adapted to distribute the draft strain between the beams whereby the plows are smoothly drawn through the soil and the tendency to side draft is eliminated.

With this object in view the device includes a bar of angle iron adapted to be attached to the front ends of the beams, there being a clevis adjustably mounted upon the said bar and connected with the draft bar of a draft appliance. Links are connected with each other and also connected with the draft bar and the bar. The links are connected with the draft bar at the same point at which the clevis is connected therewith and the draft strain is distributed through the clevis and the links to the bar which in turn transfers the same to the plow beams which are connected with one end portion of the bar.

In the accompanying drawing:—

Figure 1 is a plan view of the head end and clevis applied.

Fig. 2 is an enlarged plan view of the clevis.

Fig. 3 is a transverse sectional view of the same cut on the line 3—3 of Fig. 2.

As illustrated in the accompanying drawing, the plow structure comprises beams 1, which carry furrow openers 2 and which are connected with a sulky 3 in the usual manner.

The device comprises a bar 4 which is rectangular in transverse section and which is attached to the forward ends of the beams 1 and a brace 1'. When the bar 4 is applied as above indicated its forward or horizontal portion is disposed in advance of the said beams and the said horizontal portion is provided with perforations 5. A clevis 6 is attached to the forward portion of the bar 4 by means of a pin 7 which passes vertically through the clevis and one of the perforations 5. A link 8 is pivotally connected with the clevis 6 for vertical swinging movement and a draft bar 9 is pivotally connected with the forward end of the link 8 for horizontal swinging movement.

Suitable double-trees are pivotally connected with the ends of the draft bar in a usual manner and swingle trees are mounted upon the double trees. A loop 10 is connected with the forward portion of the bar 4 by means of a pin 11 which passes through one of the perforations 5 in the vicinity of the forward ends of the beams 1. A link 12 connects the loop 10 with the forward end of the link 8 and the draft bar 9. A pivot pin 13 is used in common for pivotally connecting the links together and with the draft bar 9. The link 12 has universal swinging movement with relation to the loop 10 and the loop 10 may swing horizontally with relation to the bar 4.

When draft animals are hitched to the draft bar 9 and the plow is in operation the draft strain is distributed along the links 8 and 12 to the bar 4 and from the bar 4 it is transmitted to the beam 1 and furrow openers 2 whereby the said beams are drawn in a straight forward direction and any tendency to side draft on the part of the furrow openers 2 is eliminated.

By adjusting the pins 7 and 11 within the perforations 5 the clevis 6 and the loop 10 may be positioned relatively close or remote from each other and consequently the angle of inclination between the links 8 and 12 may be varied and hence the draft strain may be transmitted through the said links in direct lines to different points of the bar 4 thus making it possible to apply the draft strain to the plow beams in directions to overcome the resistance of back or side pressure to which the beams are subjected while the plow is in operation.

From the foregoing description taken in connection with the accompanying drawing it will be seen that a head end and clevis structure of simple and durable arrangement is provided and that the same may be used to advantage for distributing or directing the draft strain from the draft animals to the beams in a manner to overcome the resistance to which the beams are subjected while the plow is in operation.

Having described the invention what is claimed is:—

A device of the character described comprising a bar adapted to be attached in fixed position to a plurality of beams, said bar having a series of perforations arranged in a row extending longitudinally thereof, a clevis mounted on the bar, a pin passing through the clevis and one of the perforations whereby the clevis may swing horizontally only, a link pivotally connected with the clevis for vertical swinging movement, a loop mounted on the bar, a pin passing through the loop, and in one of the perforations in the bar whereby the loop may swing horizontally only, and a link pivotally connected with the loop for universal swinging movement and pivotally connected with the forward end of the first mentioned link, the parts being so arranged that the clevis and loop may be adjusted toward or away from each other to vary the angular disposition of the link and also to vary the positions of the clevis and loop transversely of the beams.

In testimony whereof I affix my signature.

WILLIE D. THOMAS.

Copies of this patent may be obtained for five cents each, by addressing the "Commissioner of Patents, Washington, D. C."